United States Patent [19]

Smith

[11] Patent Number: 5,186,529
[45] Date of Patent: Feb. 16, 1993

[54] CASSETTE AND CD WHEEL, AND METHOD OF CONSTRUCTING AND UTILIZING SAME

[76] Inventor: Tony A. Smith, 4458 31 St., Detroit, Mich. 48210

[21] Appl. No.: 616,332

[22] Filed: Nov. 21, 1990

Related U.S. Application Data

[63] Continuation-in-part of Ser. No. 440,254, Feb. 8, 1990.

[51] Int. Cl.⁵ .............................................. A47B 49/00
[52] U.S. Cl. .................................. 312/249.7; 312/9.45
[58] Field of Search .................. 312/13, 252, 305; 211/40

[56] References Cited

U.S. PATENT DOCUMENTS

| | | |
|---|---|---|
| 2,673,781 | 3/1954 | Heisler ................................. 312/252 |
| 3,692,376 | 9/1972 | McKinsey et al. . |
| 3,736,036 | 5/1973 | Mathus . |
| 3,752,551 | 8/1973 | Clark . |
| 3,765,738 | 10/1973 | Cobb . |
| 3,860,307 | 1/1975 | Fostel ................................... 312/252 |
| 3,862,787 | 1/1975 | Hilsinger . |
| 3,868,157 | 2/1975 | Robinson ......................... 312/252 X |
| 3,963,287 | 6/1976 | Rumble . |
| 4,052,113 | 10/1977 | Broome . |
| 4,057,305 | 11/1977 | Zdeblick . |
| 4,221,440 | 9/1980 | Morgan . |
| 4,563,102 | 1/1986 | Sanders et al. ................. 312/252 X |
| 4,650,072 | 3/1987 | Ackeret . |
| 4,715,669 | 12/1987 | Baillie et al. ........................... 211/40 |
| 4,802,587 | 2/1989 | Armijo et al. . |

Primary Examiner—Joseph Falk
Attorney, Agent, or Firm—Irving M. Weiner; Robert M. Petrik; Joseph P. Carrier

[57] ABSTRACT

A rotating storage device adapted to receive audio cassettes, compact discs and the containers associated therewith. The storage device comprises a support assembly and a storage drum, the drum including a plurality of slots or chambers for receiving the cassettes. The drum is releasably held by the support assembly for movement between a vehicle and a home for theft prevention. In addition, a drum in a support assembly in a home may be interchanged with a drum held in a vehicle or from vehicle to vehicle. The slots are oriented such that the cassettes are in a horizontal position to provide the cassettes in a natural reading position.

6 Claims, 3 Drawing Sheets

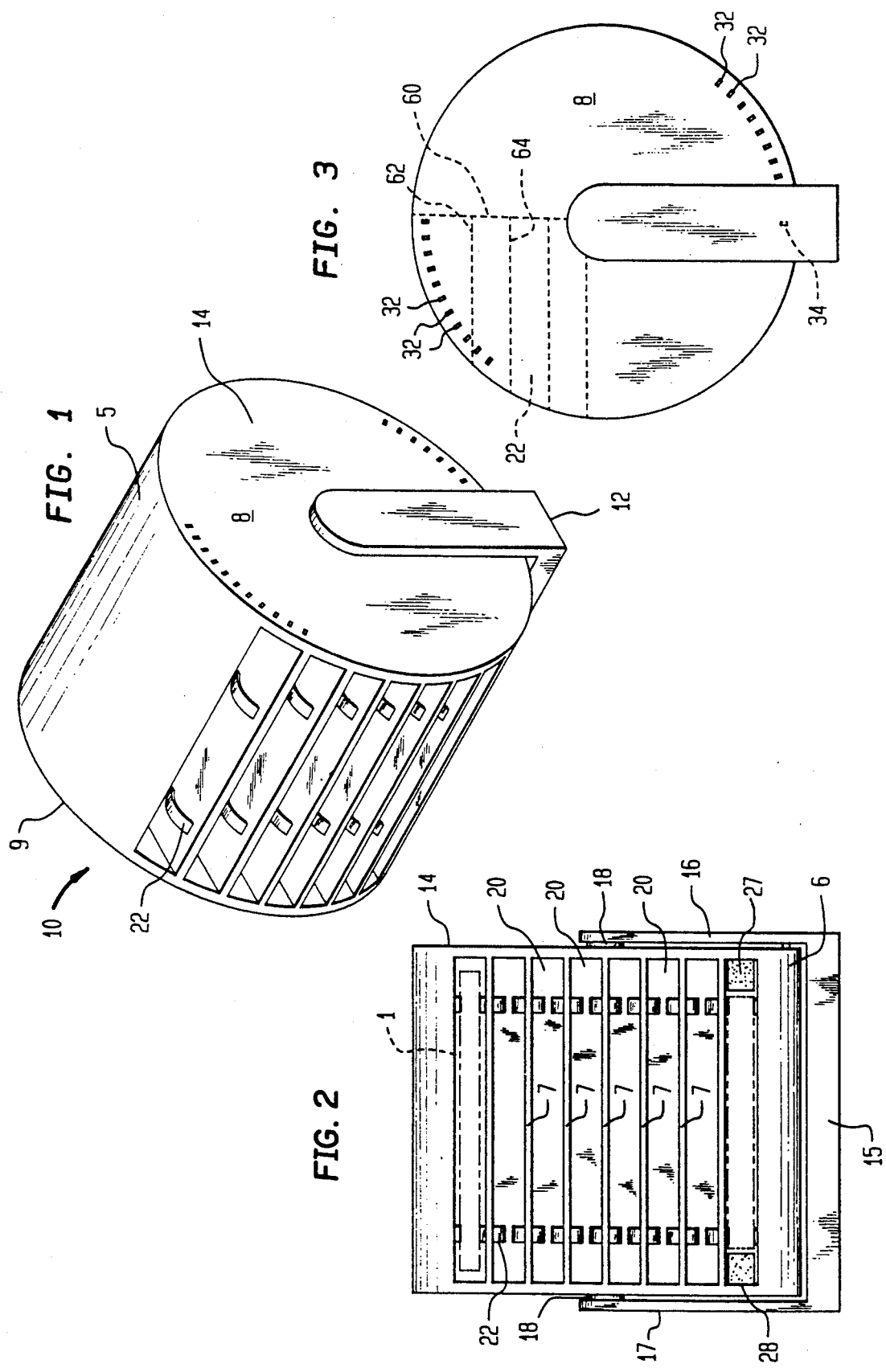

CASSETTE AND CD WHEEL, AND METHOD OF CONSTRUCTING AND UTILIZING SAME

CROSS REFERENCES TO RELATED APPLICATIONS

This is a continuation-in-part of U.S. Ser. No. 440,254, filed Feb. 8, 1990, pending.

BACKGROUND OF THE INVENTION

1. Field of the Invention

The present invention relates generally to a storage device for audio cassette tapes and compact disks (CD). The storage device of the present invention is rotatably mounted by a U-shaped support assembly, the storage device being substantially drum-shaped and secured to the support assembly at its ends.

In a preferred embodiment of the invention, storage slots are horizontally oriented and include cassette or CD retaining means at each slot opening. A least one end of the storage device interacts with the support assembly to prevent rotation of the storage device.

The storage device may be provided in two sizes, a first smaller embodiment for use in motor vehicles and a larger embodiment for use in a residence, the drums being interchangeable between support assemblies.

2. Description of the Related Art

There has been a profound increase in the use of audio players with the proliferation of portable tape and CD with players and optional equipment on automobiles. This has necessitated the need for storage devices to provide convenient access to the cassette tapes or compact disks. In automobiles, it is extremely unsafe for the driver to be fumbling with tapes while driving. The easier it is for the driver to locate a tape or compact disc for playback, the less time the driver has to divert his attention and eyes from the road, possibly preventing accidents and injuries.

Examples of prior storage devices include U.S. Pat. Nos. 4,221,440; 3,963,287; 4,650,072; 4,057,305; 4,802,585; 4,052,113; 3,752,551; 3,862,787; 3,765,738; 3,736,036; and 3,692,376.

While each of these prior storage devices retain a plurality of cassettes, the shortcomings of these devices include identification of individual cassettes, secureability of the storage device and secureability of each cassette.

The present invention overcomes these shortcomings and provides an improved storage device for cassettes or compact discs.

SUMMARY OF THE INVENTION

The present invention provides a storage device wherein the cassettes are rotatably about a horizontal axis presenting the labels on the cassettes and their labels in a normal reading orientation. The storage device is removable from the support assembly to provide portability and interchangeability.

The storage device comprises a drum-like container including a plurality of horizontally oriented slots or chambers for receiving the cassettes or compact disks. Normally, these items are enclosed in a case and the use of the term "cassette" is intended to include the tape or compact disc held in such a case. Each slot or chamber includes at least one cassette retaining means to secure the cassettes in the slot while rotating the storage device and during movement of the storage device.

The support assembly comprises a generally U-shaped device including a pair of flexible arms for engaging the drum-like container. The support assembly having rotation locking means for preventing rotation of the storage device except as desired.

It is an object of the present invention to provide an improved cassette storage device that is mountable for rotation and removable from the support assembly for portability.

It is a further object of the present invention to provide a cassette storage device mounted on a horizontal axis for easy identification of cassette labels.

It is a further object of the present invention to provide a cassette storage device having horizontally oriented storage slots.

Still another object of the invention is to provide a cassette storage device which may be mounted in a vehicle on the floor or dash and removed from the vehicle to prevent theft of the cassettes.

The above and further objects, details and advantages of the invention will become apparent from the following detailed description, when read in conjunction with the accompanying drawings.

BRIEF DESCRIPTION OF THE DRAWINGS

FIG. 1 illustrates a perspective view of a first embodiment of a cassette storage device in accordance with the present invention.

FIG. 2 illustrates a front view of the storage device shown in FIG. 1.

FIG. 3 illustrates a side view of the storage device shown in FIG. 1.

DETAILED DESCRIPTION OF THE PREFERRED EMBODIMENTS

Figure 4:
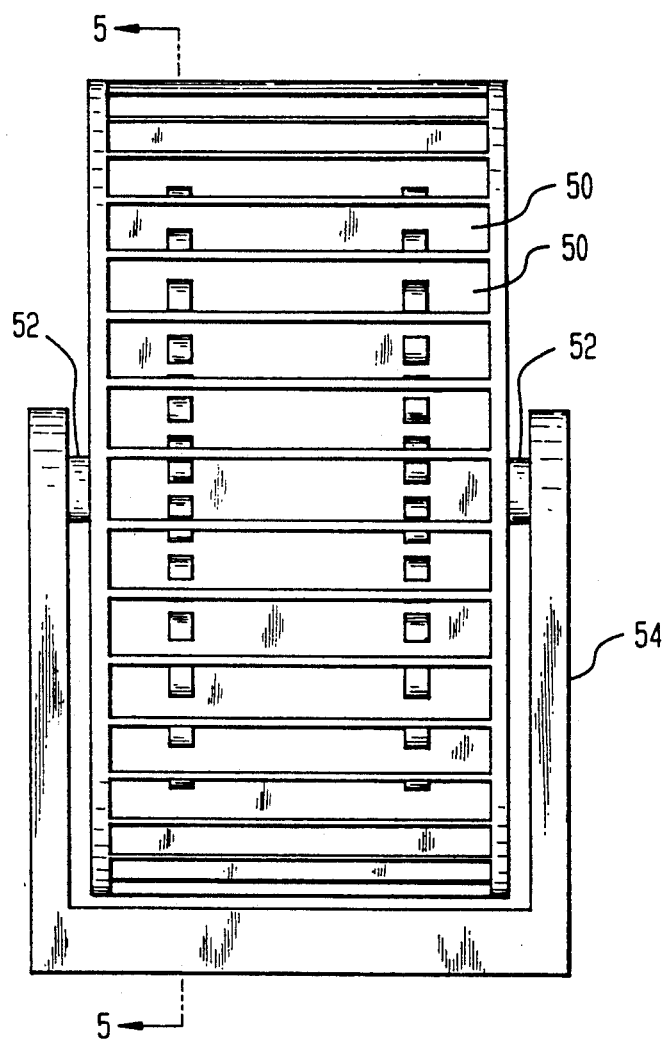
FIG. 4 illustrates a front view of a second embodiment of a cassette storage device utilizing radially extending slots in accordance with the present invention.

Referring to FIG. 1, there is illustrated a preferred embodiment of the present invention, generally designated as storage device 10. As clearly shown in FIG. 1-3, the storage device 10 comprises a support means 12 and wheel or drum 14.

As best seen in FIG. 2, support means 12 comprises a base 15 and generally parallel arms 16 and 17. Arms 16, 17 are sufficiently flexible to permit removal of drum 14 from the means 12 for transportation to another location (such as from a vehicle to a home) for safety. Base 15 may be secured to the floor or dashboard of a vehicle by securement means such as bolts (not shown) adhesive double-sided tape (not shown), or VELCRO hook and loop fasteners (not shown). For a device not used in a vehicle, the base may be provided wide enough to provide stability as a free-standing accessory. Support means 12 engages drum 14 at ears 18 extending inwardly from the distal ends of arms 16, 17. An indentation or receiver (not shown) is provided on each side of the drum 14 for accepting ears 18. In use, when it is desired to remove drum 14 from support means 12, arms 16, 17 are flexed outwardly sufficiently to disengage ears 18 from the drum 14. To attach the drum 14 to the support means 12, the arms 16, 17 are flexed outwardly and ears 18 inserted into the indentation or receptor.

As shown in FIG. 1, a plurality of horizontally disposed slots or chambers 20 are provided on two sides of drum 14. Each slot 20 includes at least one cassette securement means 22. Preferably, cassette securement means 22 comprises at least one pair of opposing spring means adapted to engage each side of a cassette 1. The securement means 22 are designed to flex inwardly to permit passage of cassette 1 into the slot 20 and provide sufficient outward force on the cassette to secure it during rotation of drum 14. Preferably, securement means 22 comprises a pair at least one or pair of resilient members which are opposed arcuate spring members (best seen in FIG. 5) 25, 26. Alternatively, opposed rubber cushions 27, 28 (FIG. 5) may be employed to secure a cassette; the cushion provided on the drum end walls (8, 9) or the slot dividing walls (7).

Drum 14 is substantially cylindrical in shape and includes end walls 8, 9, divider members 7 and top and bottom cover members 5, 6. At least one end wall 8 may include protrusions 32 which engages with a substantially identical protrusion 34 comprising a lock means on the support assembly 12 to prevent rotation of wheel or drum 14. When it is desired to rotate drum 14, sufficient force to resiliently deform the protrusions 32 must be applied to permit a protrusion 32 to pass protrusion or lock means 34. Protrusions 32 may be provided around the entire periphery of one of the end walls (8, 9) or they may be spaced to correspond with the location of slots or chambers 20 to permit convenient viewing of the contents of each slot 20. For example, the number of protrusion 32 may correspond to the number of slots, the protrusions 32 located on the end wall such that movement past the first protrusion will place the first slot 20 at the top of the rotation of the drum 14.

Each slot 22 is defined by a back wall 60 which substantially divides the drum 14 into equal halves. Divider members 7 form Top (first) and bottom (second) walls 62, 64 which extend perpendicularly from the back wall 60. End walls are provided by drum ends 8, 9.

Figure 5:
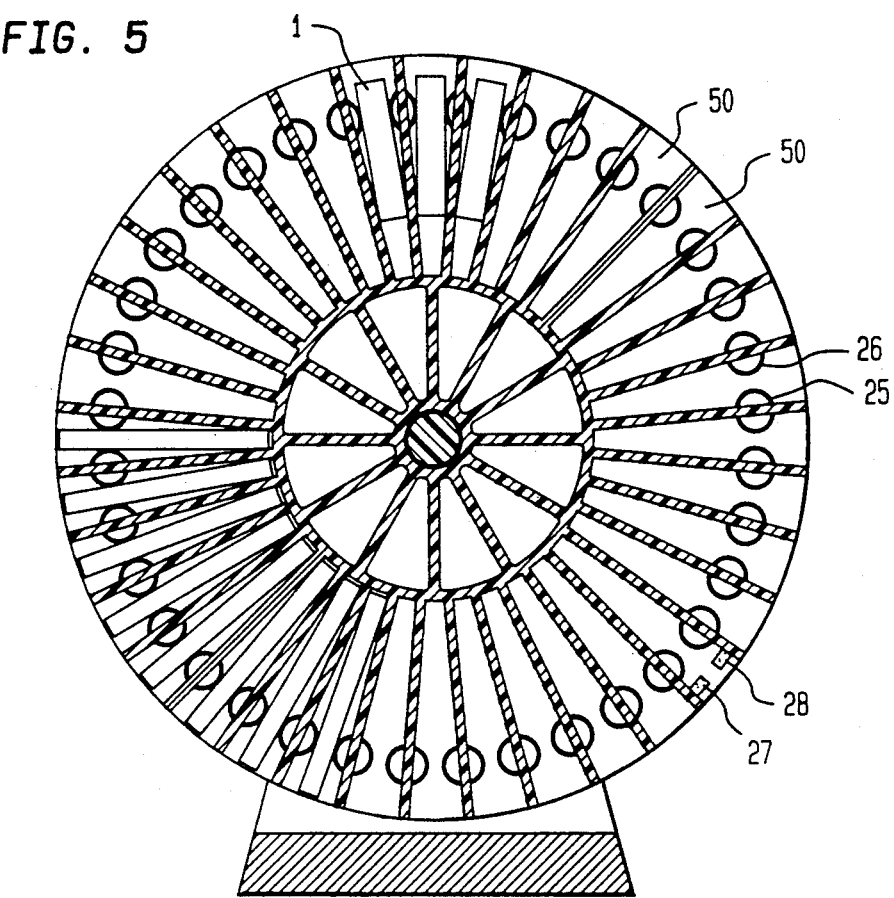
FIG. 5 illustrates a cross-section of the storage device taken along line 5—5 in FIG 4.
Figure 6:
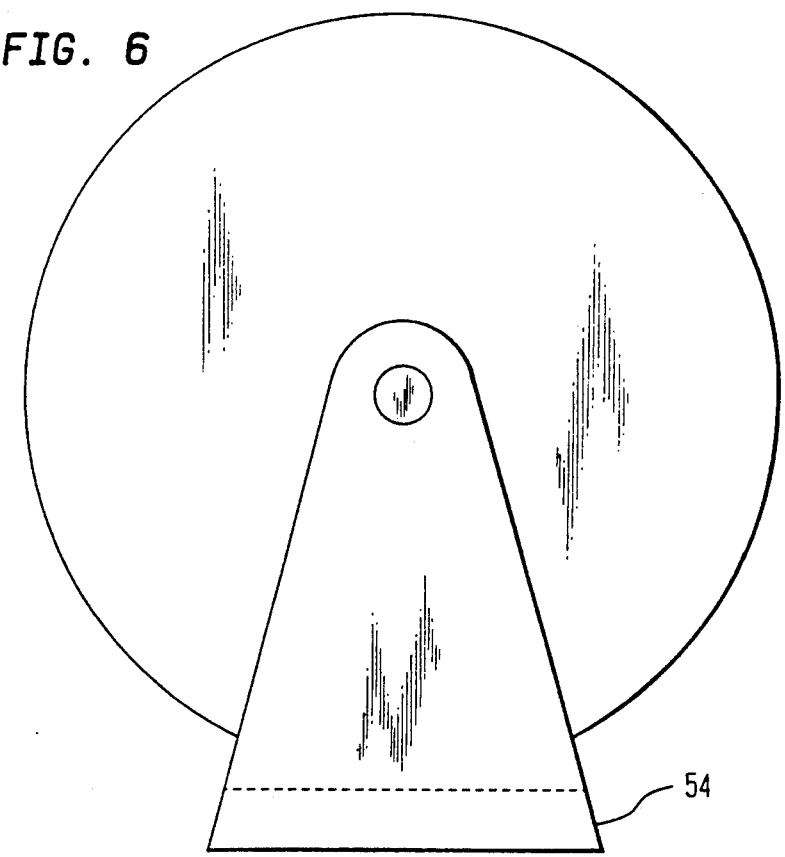
FIG. 6 illustrates a side view of the storage device shown in FIG. 4.

A second embodiment of the storage device is shown in FIGS. 4–6, the main feature being the use of radially extending slots 50 (best seen in FIG. 5) providing a larger member of spaces available for storing cassettes. The slot 50 taper toward the center of the drum, an inner circular member optionally provided to define a back wall for each slot. In addition, the base of support assembly 54 is wider (FIGS. 5 and 6) for additional support. In addition, receptors 52 on the end walls of the drum or wheel can be clearly seen in FIG. 4.

In use, a drum or wheel 14 may be interchangeable with the support assembly 12 or 54 permitting the cassettes held in the drum 14 to be conveniently available to the user at all items.

Although there has been described what is at present considered to be preferred embodiments of the invention, it will be understood that various modifications and variations may be made therein, and it is intended to cover in the appended claims all such modifications as fall within the true spirit and scope of the invention.

I claim:

1. An interchangeable cassette storage assembly adapted to receive cassette tapes, compact discs and the containers associated therewith, comprising:
   a storage drum including a plurality of slots therein rotatably and releasably secured by a support assembly, said storage drum supported at its end such that said slots are horizontally oriented;
   said support assembly including a base with a pair of flexible arms secured thereto, said arms are adapted to flex outwardly to release said drum, said drum retained at the distal ends of said arms;
   each of said slots includes cassette retaining means for securing a cassette in said slot during rotation and movement of said drum;
   said storage drum having a plurality of resilient protrusions thereon which individually interact with a locking means on said support assembly wherein sufficient force must be applied to said drum to deform said protrusions to permit rotation of said drum; and
   said flexible arms releasably secure said drum to permit moving said drum to another location.

2. The cassette storage assembly of claim 1, wherein:
   said slots are defined by a back wall which divides said drum into two halves, first and second walls extending perpendicularly from said back wall to define said slots.

3. The cassette storage assembly of claim 1, wherein:
   said slots extend radially from the center of said drum.

4. The cassette storage assembly of claim 2, wherein:
   a first support assembly is provided in a building;
   a second support assembly is provided in a vehicle; and
   said storage drum interchangeably moved from said first support assembly to said second support assembly.

5. The cassette storage assembly of claim 4, wherein:
   said second support assembly is secured to the floor of said vehicle.

6. The cassette storage assembly of claim 4, wherein:
   said second support assembly is secured to the dashboard of said vehicle.

* * * * *